(12) United States Patent
Bideau et al.

(10) Patent No.: US 9,212,931 B2
(45) Date of Patent: Dec. 15, 2015

(54) METHOD OF ASSISTING PILOTING AN AIRCRAFT BY ADAPTING THE DISPLAY OF SYMBOLS

(71) Applicant: AIRBUS OPERATIONS (SAS), Toulouse (FR)

(72) Inventors: David Bideau, Toulouse (FR); Mathieu Rustin, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/173,283

(22) Filed: Feb. 5, 2014

(65) Prior Publication Data

US 2014/0222256 A1 Aug. 7, 2014

(30) Foreign Application Priority Data

Feb. 6, 2013 (FR) ...................................... 13 50992

(51) Int. Cl.
*G06F 7/70* (2006.01)
*G06F 19/00* (2011.01)
*G06G 7/00* (2006.01)
*G06G 7/76* (2006.01)
*G01C 23/00* (2006.01)

(52) U.S. Cl.
CPC ...................................... *G01C 23/00* (2013.01)

(58) Field of Classification Search
CPC .... G01C 21/3682; G01C 23/00; G01C 21/32; G01C 21/34; G01C 21/36; G01C 21/3407; G01C 21/367; G01C 21/20; G01C 21/3638; G01C 21/22; G06F 21/36; G06F 19/00; G06F 17/00; G06F 21/00; G06F 3/04842; G06F 3/013; G06F 3/005; G06F 3/044; G06F 3/011; G06F 17/30

USPC ........... 701/7, 18, 14, 438, 457, 16, 2, 120, 4, 701/117, 15, 455; 345/173, 1.1, 634

See application file for complete search history.

(56) References Cited

U.S. PATENT DOCUMENTS

| | | | | |
|---|---|---|---|---|
| 6,154,151 A * | 11/2000 | McElreath et al. | ........... | 340/970 |
| 6,381,519 B1 * | 4/2002 | Snyder | ............................. | 701/3 |
| 7,312,725 B2 * | 12/2007 | Berson et al. | ................. | 340/980 |
| 7,418,319 B2 * | 8/2008 | Chen et al. | ...................... | 701/14 |
| 7,486,291 B2 * | 2/2009 | Berson et al. | ................. | 345/427 |
| 7,577,501 B2 * | 8/2009 | Tafs et al. | ....................... | 701/14 |
| 8,026,834 B2 * | 9/2011 | Larson et al. | ................. | 340/980 |
| 8,305,238 B2 * | 11/2012 | Wegner et al. | ............... | 340/946 |
| 8,400,330 B2 * | 3/2013 | He et al. | ........................ | 340/960 |
| 8,484,576 B2 * | 7/2013 | Berson et al. | ................. | 715/788 |
| 8,682,504 B2 * | 3/2014 | Vos et al. | ......................... | 701/3 |

(Continued)

*Primary Examiner* — Calvin Cheung
*Assistant Examiner* — Luis A Martinez Borrero
(74) *Attorney, Agent, or Firm* — Nixon & Vanderhye P.C.

(57) ABSTRACT

The invention relates to a method of assisting piloting an aircraft. The method is performed when the real position of a symbol for display lies outside the display limit of the screen. The symbol is representative of a parameter associated with the dynamic behavior of the aircraft (FPV, . . . ) or liable to influence said behavior (FD, . . . ). The symbol possesses two components, and the first component is to be given precedence on display over the second component. In the method, the display of the symbol depends firstly on the orthogonal projection (FPV-lock) of the real position (FPV) of the symbol onto the axis of the first component, and secondly on the position of said projection relative to the display limit of the screen. Such a display makes it possible to give reliable information to the pilot.

17 Claims, 7 Drawing Sheets

(56) References Cited

U.S. PATENT DOCUMENTS

| | | | |
|---|---|---|---|
| 8,698,654 B2* | 4/2014 | He | 340/971 |
| 8,788,126 B1* | 7/2014 | Bull et al. | 701/14 |
| 8,880,243 B1* | 11/2014 | Duvall et al. | 701/3 |
| 2002/0145543 A1* | 10/2002 | Hausmann | 340/975 |
| 2003/0132860 A1* | 7/2003 | Feyereisen et al. | 340/973 |
| 2004/0122589 A1* | 6/2004 | Gibbs | 701/208 |
| 2005/0182528 A1* | 8/2005 | Dwyer et al. | 701/3 |
| 2007/0179684 A1* | 8/2007 | He | 701/3 |
| 2008/0231691 A1* | 9/2008 | Larson | 348/56 |
| 2009/0265088 A1* | 10/2009 | Dias et al. | 701/120 |
| 2009/0309812 A1* | 12/2009 | Larson et al. | 345/8 |
| 2010/0060990 A1* | 3/2010 | Wertheim et al. | 359/632 |
| 2010/0070176 A1* | 3/2010 | Feyereisen et al. | 701/211 |
| 2010/0082184 A1* | 4/2010 | Nichols et al. | 701/3 |
| 2010/0152932 A1* | 6/2010 | Das | 701/14 |
| 2010/0211237 A1* | 8/2010 | Nichols et al. | 701/14 |
| 2010/0231418 A1* | 9/2010 | Whitlow et al. | 340/945 |
| 2010/0235019 A1* | 9/2010 | De Bono et al. | 701/14 |
| 2012/0143406 A1* | 6/2012 | O'Connor et al. | 701/3 |
| 2013/0345905 A1* | 12/2013 | Parthasarathy | 701/3 |

* cited by examiner ically horizontal frame of reference having at least one of
METHOD OF ASSISTING PILOTING AN AIRCRAFT BY ADAPTING THE DISPLAY OF SYMBOLS This application claims priority to FR Application No. 1350992 filed Feb. 6, 2013, the entire contents of which is hereby incorporated by reference.

BACKGROUND OF THE INVENTION

The invention relates to a method of assisting piloting an aircraft.

Aircraft cockpits are fitted with displays on which data and parameters inform the pilot, during a flight, about the state of the aircraft, and about its behavior relative to its outside environment.

For example, displays of the primary flight display (PFD) type and of the head-up display (HUD) type provide various parameters concerning attitude and guidance of an aircraft.

In certain flight configurations, the symbols representative of those parameters can reach the limit of their display zone, such that the real positions of the symbols lie outside the display zone.

For symbols reaching the limit of their display zone, it is appropriate to define rules for positioning their display without giving rise to information that is erroneous and enabling the display to continue to be useful for the pilot.

SUMMARY OF THE INVENTION

Although present rules are satisfactory, the Applicant seeks to devise new rules or logic for positioning the display of aircraft symbols that happen to be located at the limit of a display.

Thus, in a first aspect, the invention provides a method of assisting piloting an aircraft in which at least one display screen has at least one display zone bounded by a display limit line, the real position of the aircraft being positioned on said at least one display zone relative to a horizontal-vertical frame of reference associated with the screen and a terrestrial horizontal-vertical frame of reference having at least one of its axes displayed, at least one symbol representative of a parameter associated with the dynamic behavior of the aircraft (FPV, . . . ) or liable to influence this behavior (FD, . . . ) having a horizontal component and a vertical component, the method comprising a step of displaying said at least one symbol in said at least one display zone in order to assist the piloting of the aircraft when the real position (FPV) of said at least one symbol lies outside the display limit line, the method being characterized in that one of the components, referred to as a "first" component, is to be given precedence on display over the second component, and the method comprises the following steps:

determining the real position (FPV) of said at least one symbol for display relative to said at least one display zone;

determining the orthogonal projection (FPV-lock) of the real position of said at least one symbol on the axis of the first component;

determining the position of said projection (FPV-lock) relative to the display limit line of said at least one display zone, and in the event that said projection (FPV-lock) is situated outside said display limit line, repositioning said projection on said display limit line;

determining the position of said at least one symbol on the axis of the second component passing through the position determined in the preceding step as a function of the value of the second component of said at least one symbol;

determining said position relative to the display limit line of said at least one display zone, and in the event that said position is situated outside said display limit line, repositioning said position on said display limit line; and displaying said at least one symbol in the display position as determined in this way in the preceding step.

The new rules for positioning a symbol (or a plurality of symbols) for display take account initially of the real position of the symbol, of the orthogonal projection of the real position onto the axis of the first component, referred to as the orthogonal projection, and the position of the orthogonal projection relative to the display limit line. Thereafter, account is also taken of the position of the symbol on the axis of the second component passing through the position of the orthogonal projection (possibly taken to the display limit line) relative to the display limit line. Depending on this relative position, the position of the symbol is optionally taken to the display limit line. By way of example, depending on the position of the orthogonal projection relative to the display limit line (and thus depending on the display space available in said at least one display zone), the display of the symbol may be reduced to displaying only the first component (in a position that might possibly be limited), since this is the component that is to be given precedence, or may take the form of displaying the first component in non-limited manner together with the second component in limited manner.

In certain circumstances, it is possible to envisage omitting the second component in order to maximize the information (sign and value) carried by the first component. Under certain circumstances in which the value of the first component is limited, the sign associated with the component is conserved in order to avoid providing the pilot with information that is erroneous.

When the value of one of the components is limited, it is possible to display beside the display symbol in its limited position the value of the (first and/or second) component before being limited.

It should be observed that the order in which the components are processed shows that the first component is given precedence over the second component. If precedence is to be given to the second component, then the first three steps of the method would relate to the second component.

According to a first possible characteristic, when the orthogonal projection of the real position of said at least one symbol is situated inside said at least one display zone bounded by the display limit line, the method includes a substep of determining a limitation for the value of the second component of said at least one symbol in order to position said at least one symbol in a limited position that is situated on the display limit line of said at least one display zone.

In this situation, the value of the first component (given precedence) of the symbol is conserved (as is its sign), whereas the value of the second component is limited.

Nevertheless, the sign of the second component is conserved, thereby providing the pilot with information that is of use.

According to a second possible characteristic that constitutes an alternative to the first characteristic, when the orthogonal projection of the real position of said at least one symbol is situated outside said at least one display zone bounded by the display limit line, the method includes a substep of determining a limitation for the value of the first component of said at least one symbol in order to position said at least one symbol in a limited position that is situated on the display limit line of said at least one display zone.

In this situation, the value of the first component (given precedence) is limited only to the value that corresponds to the point of intersection between the axis of the first component and the display limit line of the display zone.

The information (sign and value) about the second component that is not given precedence might not be retained during the display of the symbol since, ignoring special cases, there is no longer enough display space available on said at least one display zone. This therefore makes it possible to display the symbol in its position as limited in this way on the display limit line of the display zone. The above-mentioned special cases correspond to cases in which the display limit is made of segments. In flight configurations in which the wings of the aircraft are parallel to one of these segments, after orthogonal projection of the symbol on the segment, there exists a degree of freedom for displaying the second component on the segment.

It should be observed that in general, it may be desirable to obtain more information about the second component while displaying the symbol, while nevertheless continuing to give precedence to displaying the first component.

To this end, it is possible to envisage having two display windows or zones, with one being incorporated inside the other.

More particularly, said at least one display zone may have a first display zone inside which there is arranged a second display zone, the display position of said at least one symbol depending more particularly, firstly on the orthogonal projection on the axis of the first component of the real position of said at least one symbol, and secondly on the position of said projection relative to the display limit line of the second display zone (two display windows). Thus, all of the information about the value of the first component might not be retained depending on circumstances, but some information is nevertheless acquired about the second component (sign, and possibly value). In general, the second zone is added inside the first zone, which is larger. The use of two display zones makes it possible to conserve information at least about the sign of the second component, and possibly to obtain the value of the second component in full, or at least a limited version of said value.

The use of two display zones leads to several situations:

1) When the orthogonal projection of the real position of said at least one symbol, referred to as the "orthogonal projection", is situated inside the second display zone bounded by the display limit line, the method includes a substep of determining a limitation for the value of the second component of said at least one symbol in order to position said at least one symbol in a limited position that is situated on the display limit line of the first display zone. The value of the first component is conserved (as is its sign) and the display of the symbol also contains additional information about the second component (limited value and sign).

2) When the orthogonal projection is situated outside the second display zone bounded by its display limit line, the method includes the following two substeps:

determining a limitation for the value of the first component of the orthogonal projection to the value corresponding to the intersection between the axis of the first component and the display limit line of the second display zone so as to take the orthogonal projection to an intermediate limited position and thus obtain a limited orthogonal projection; and determining the position of said at least one symbol on the axis of the second component passing through the position of the limited orthogonal projection determined in the preceding step as a function of the value of the second component of said at least one symbol.

The value of the first component is not conserved in full: it is limited by the value of the component of the limited orthogonal projection on the display limit line of the second zone. The display of the symbol also contains additional information about the second component (sign and optionally limited value). The closer the display limit line of the second zone to the display limit line of the first zone, the greater the extent to which the value of the first component is conserved. Nevertheless, less space is available for displaying the value of the second component (loss of accuracy about the second component). Thus, the limiting of the value of the second component depends on the available space remaining and on the value itself of the second component.

According to a possible characteristic, the two display zones are defined relative to each other so as to be spaced far enough apart to make it possible, if necessary, to display said at least one symbol between the display limit lines of said display zones. The definition of the second zone relative to the first depends on the intended application and on the display targets that have been set (e.g. maximizing the display of the first component and minimizing the display of the second component, i.e. displaying at least its sign).

According to other possible characteristics taken in isolation or in combination with one another:

the axis of the first component (axis of the orthogonal projection) is selected relative to a predetermined criterion;

the axis of the first component is the pitch scale axis that is displayed on said at least one display zone; this constitutes a horizontal projection in the terrestrial reference frame, making it possible to conserve the value of the vertical component (first component) of the symbol; this is useful depending on the symbol for display; for example if it is a symbol representative of the flight path vector (FPV) of the aircraft, it is useful to conserve the vertical component (first component) constituted by the flight path angle; the horizontal component, constituted by the drift or yaw angle, need not necessarily be retained, depending on the circumstances envisaged;

the method includes displaying beside said at least one symbol displayed in its limited position, the value of said at least one component of said at least one symbol prior to being limited, this information may be useful to the pilot;

said at least one symbol has a vertical first component and a horizontal second component, the vertical first component being given precedence in the display over the second component;

said at least one symbol for displaying comprises a first symbol representative of the flight path vector in which the horizontal component is drift or yaw angle and the vertical component is flight path angle; by way of example, the rules for positioning this symbol are firstly conserving the value of the vertical component and, when that is not possible, positioning the symbol on the display limit line of the display zone while conserving the sign of the vertical component (in order to tell the pilot whether the aircraft is climbing or descending), and secondly to conserve the value of the horizontal component without contradicting the above-mentioned positioning rules relating to the vertical component; if it is not possible to conserve the value of the horizontal component, the positioning rules provide for positioning the symbol on the display limit line of the display zone while conserving the sign of the horizontal component (in order to tell the pilot on which side the yaw angle is located);

said at least one symbol for display also comprises a second symbol representative of an aircraft guide parameter and constitutes a flight path setpoint to be reached by the flight path vector of the aircraft;

said at least one display zone also comprises a display zone for displaying the second symbol representative of an aircraft guide parameter and having arranged therein at least one display zone for displaying the first symbol; and the step of displaying the second symbol representative of an aircraft guide parameter comprises, more particularly, a substep performed as a function of the real position of said second symbol relative to the display limit line of said display zone for the second symbol:

displaying said second symbol in said display zone in its real position; or determining a limited position for said second symbol by projecting said symbol onto the display limit line of said display zone in the direction given by the line passing through the real position of said symbol and the position displayed in said at least one display zone for the first symbol of the first symbol representative of the flight path vector of the aircraft, and displaying said second symbol in its position as limited in this way.

In a second aspect, the invention also provides a computer program including instructions for executing the steps of the method as described briefly above when said program is executed by a system in which said program is loaded.

In a third aspect, the invention also provides a system for assisting piloting an aircraft, the system comprising at least one display screen that includes at least one display zone bounded by a display limit line, the real position of the aircraft being positioned on said at least one display zone relative to a horizontal-vertical frame of reference associated with the screen and a terrestrial horizontal-vertical frame of reference having at least one of its axes displayed, at least one symbol representative of a parameter associated with the dynamic behavior of the aircraft (FPV, ...) or liable to influence this behavior (FD, ...) having a horizontal component and a vertical component, the system being characterized in that one of the components, referred to as a "first" component, is to be given precedence on display over the second component, the system comprising:

means for determining the real position (FPV) of said at least one symbol for display relative to said at least one display zone;

means for determining the orthogonal projection (FPV-lock) of the real position of said at least one symbol on the axis of the first component;

means for determining the position of said projection (FPV-lock) relative to the display limit line of said at least one display zone, and in the event that said projection (FPV-lock) is situated outside said display limit line, for repositioning said projection on said display limit line;

means for determining the position of said at least one symbol on the axis of the second component passing through the position determined in the preceding step as a function of the value of the second component of said at least one symbol;

means for determining said position relative to the display limit line of said at least one display zone, and in the event that said position is situated outside said display limit line, for repositioning said position on said display limit line; and means for displaying on said at least one symbol screen said at least one symbol in the display position as determined in this way.

The characteristics mentioned above with reference to the method apply likewise to the system as briefly described above.

The invention also provides an aircraft including such a system.

BRIEF DESCRIPTION OF THE DRAWINGS

Other characteristics and advantages appear from the following description given purely by way of non-limiting example and made with reference to the accompanying drawings, in which.

DESCRIPTION OF AN EMBODIMENT OF THE INVENTION

A first implementation of a method of the invention for assisting piloting an aircraft is described with reference to FIGS. 1 and 2.

Figure 1:
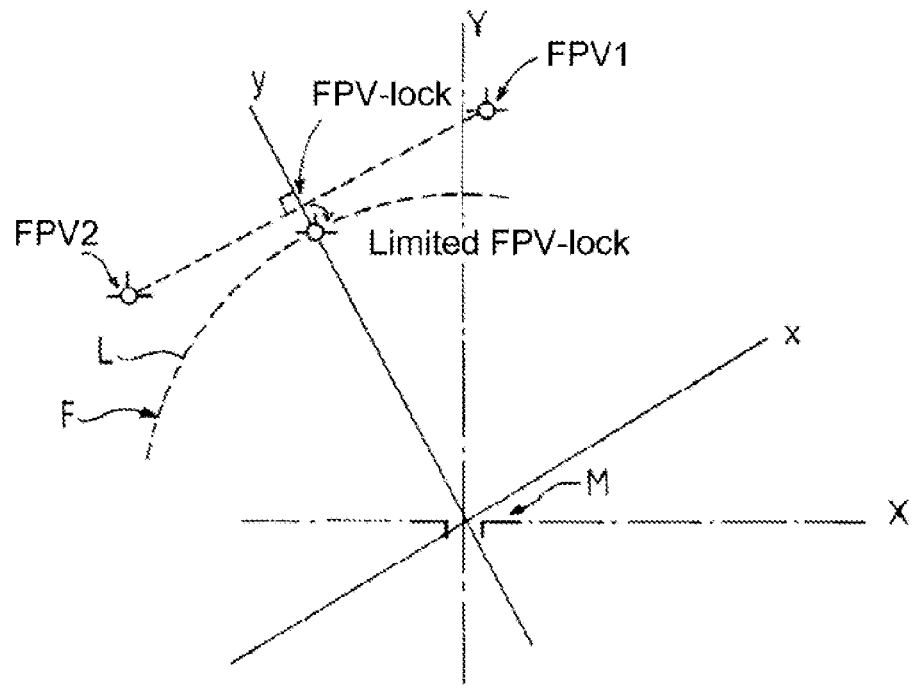
FIGS. 1 and 2 are general diagrammatic views of a display screen showing a first implementation of a method of assisting piloting an aircraft applied to two different situations.

FIG. 1 is a very diagrammatic view of a display screen of a non-conventional primary flight display (PFD) type. This screen comprises a display window or zone F (used solely for calculating and positioning the symbol(s) for display, but not visible on the screen for the pilot), which window is circular in shape, for example. Nevertheless, it is possible to envisage other shapes: rectangular, square, oblong, . . . .

Only the top left corner of the window F is shown for reasons of simplification.

The display window F is bounded by a peripheral line L that defines it and that constitutes a line referred to as the "display limit line" or more simply as the "display limit". No display takes place on the screen beyond the display limit L of the window. Generally, the window F possesses a maximum size that it is capable of occupying on the screen in order to optimize display possibilities for the screen.

On the screen, there are shown two distinct horizontal-vertical frames of reference: a first reference frame (X,Y) associated with the screen and thus with the aircraft; and a second reference frame (x,y) that is terrestrial and of position relative to the first screen that varies over time as a function of the real position of the aircraft. This real position is marked at the center of the screen by an aircraft model referenced M. The center of the screen corresponds to the position of the axis of the fuselage of the aircraft. In practice, the aircraft model on the screen represents the origin of the reference frame associated with the airplane. In FIG. 1, the horizontal line $\underline{x}$ of the terrestrial reference frame is displayed together with the pitch scale of the aircraft, which in fact marks the vertical axis $\underline{y}$ of the terrestrial reference frame.

A first symbol representative of a parameter associated with the dynamic behavior of the aircraft, such as the flight path vector (FPV) of the aircraft (i.e. an aircraft guide parameter) is to be displayed on the display screen. This first symbol has a vertical first component corresponding to the flight path angle (FPA) and a horizontal second component that corresponds to drift or yaw angle, marked Drift.

Furthermore, a second symbol representative of a parameter liable to influence the dynamic behavior of the aircraft, such as the setpoint flight path to be reached by the FPV (i.e. an aircraft guide parameter written FD for "Flight Director") may also be displayed on the display screen.

While displaying the first symbol FPV, it can happen that its real position is at the display limit on the display screen. The vertical first component FPA of the first symbol FPV should be given precedence for display insofar as this component informs the pilot whether the aircraft is climbing or descending. The horizontal second component Drift informs the pilot about the side on which the yaw angle of the aircraft is to be found. This second component is generally considered as being less important for display than the first component.

There follows a description of new rules for assisting the pilot of the aircraft in piloting tasks in the first implementation for positioning/displaying the first symbol FPV on the display screen.

The first implementation of the method of assisting piloting provides for displaying the first symbol while performing the following prior substeps:
  determining by calculation the real position, written FPV, of the first symbol FPV to be displayed relative to the display window F (if the real position is situated inside the window then the symbol can be displayed in this real position and the following steps can be omitted);
  determining by calculation the orthogonal projection, written FPV-lock, onto the pitch scale axis (vertical axis of the terrestrial reference frame which is the axis of the first component), of the real position of the symbol FPV; and
  determining the position of the orthogonal projection FPV-lock relative to the display window F, and more particularly relative to the display limit L of the window.

Depending on the real position of the symbol (FPV) and on the position of its orthogonal projection (FPV-lock) as determined in this way, the method provides for positioning the symbol (for display purposes) in appropriate manner on the display screen by giving precedence to the first component FPA of the symbol over its second component. This positioning is performed so as to avoid giving erroneous information to the pilot, in particular concerning the sign of the first component.

FIG. 1 shows the situation of two first symbols FPV1 and FPV2 having respective real positions that are situated outside the display window F and that have the same orthogonal projection FPV-lock on the pitch scale axis.

This orthogonal projection FPV-lock lies beyond the display limit L.

In order to give precedence to the first component in the display, the method then makes provision for positioning the symbol by performing a substep of determining a limit for the value of the first component of the symbol. On display, this limit makes it possible to reposition the symbol in a limited position, written "limited FPV-lock", which is situated on the display limit L of the display window F (FIG. 1).

This limited position is identical for both symbols FPV1 and FPV2.

In this example, the sign of the first component of each symbol is conserved and the value of this first component is reduced as little as possible in order to optimize the display of the first component of the symbol. The displayed symbol in its limited position "limited FPV-lock" does not have any information about the second component (Drift) and therefore does not tell the pilot on which side the yaw angle is located (i.e. the sign of the second component). Nevertheless, this positioning rule results from a design choice of optimizing the display of the first component of the symbol to the detriment of the display of the second component.

It should nevertheless be observed that the sign of the second component (and indeed its value) may, for example, be displayed beside the symbol that is displayed in its limited position "limited FPV-lock" in order to provide additional assistance to the pilot.

As explained below while describing other implementations, this rule may be varied while continuing to give precedence to the first component, and nevertheless giving greater importance to displaying the second component and to associated information.

Figure 2:
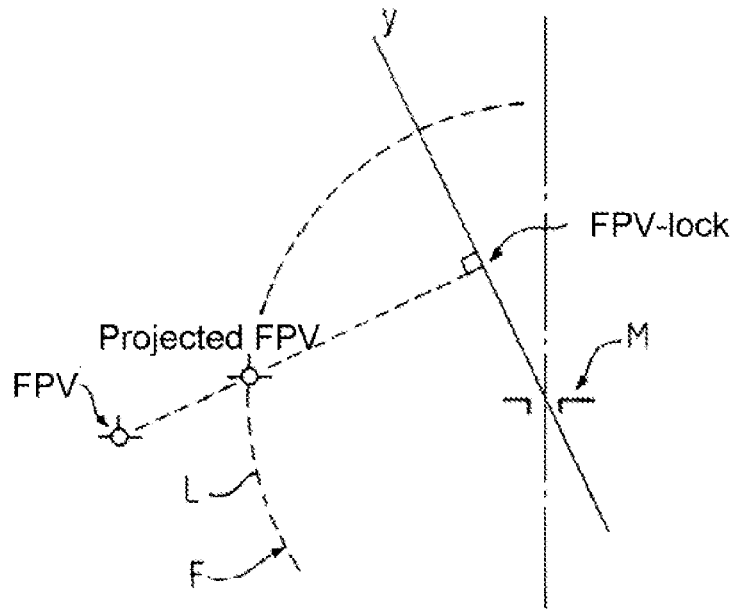

FIG. 2 shows another situation in which the real position of the first symbol FPV lies outside the window F and the orthogonal projection (FPV-lock) on the pitch scale axis $\underline{y}$ lies inside the window bounded by the display limit L.

In order to give precedence to the first component for display, the method then makes provision for positioning the symbol by performing a substep of determining a limit for the value of the second component (Drift) of the symbol. This limit makes it possible, on display, to position the symbol in a position that is said to be limited or projected (since it results from a projection) that is written "projected FPV" and that is situated on the display limit line L of the display window F (FIG. 2).

Given the real position of the symbol FPV, the symbol as displayed in its limited position "projected FPV" conserves all of the information (sign and value) concerning the first component (FPA) and it includes a certain amount of useful information about the second component (its sign and a limited value).

A second implementation of the method of assisting piloting an aircraft is described below with reference to diagrammatic FIGS. 3 to 7.

Figure 3:
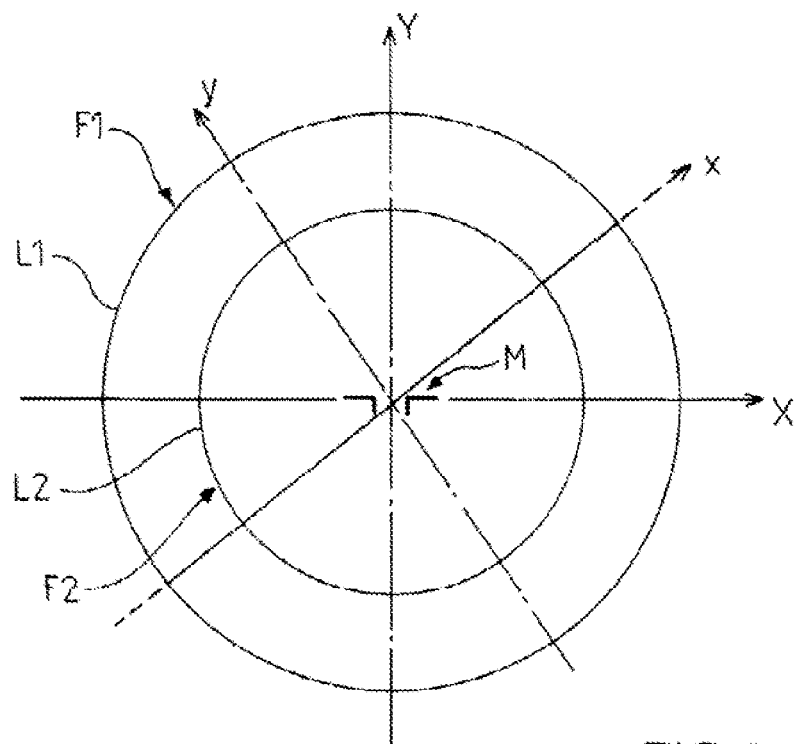
FIG. 3 is a general diagrammatic view showing the principle of two display windows.

FIG. 3 shows in highly diagrammatic manner a display screen of the PFD type. This screen has two display windows or zones (used solely for calculating and positioning the symbol(s) for display but not visible for the pilot) located one within the other, and each being circular in shape, for example. Nevertheless, other shapes could be envisaged: rectangular, square, oblong, . . . .

A first window F1 surrounds a second window F2 of smaller radius. The two display windows are spaced far enough apart from each other to make it possible, should that be necessary, to display (a symbol, a value, . . . ) in the empty space between the two display windows.

Each display window F1, F2 is bounded by a peripheral line (respectively referenced L1, L2) that defines it and that constitutes a display limit line or display limit. For example, no display is made outside the display limit L1 of the first window.

As in the first embodiment, the screen displays the first reference frame (X,Y) associated with the screen and thus with the aircraft, and the terrestrial second reference frame (x,y), together with the aircraft model M. Everything mentioned in general manner concerning the first implementation applies in this implementation and is therefore not repeated.

As mentioned above, on displaying the first symbol FPV, it can happen that its real position lies in the display limit on the display screen (i.e. outside the display limit). There follows a description of new rules for positioning the first symbol FPV on the display screen that involves the use of two display windows, as shown in FIG. 3. The following figures show only the top left quarter of the screen for reasons of simplification.

In this second implementation, the method provides for displaying the first symbol FPV by performing the following prior substeps:
   determining by calculation the real position, written FPV, of the first symbol FPV for display relative to the first display window F1;
   determining by calculation the orthogonal projection FPV-lock on the pitch scale axis (vertical axis of the terrestrial reference frame or axis of the first component) of the real position of the symbol FPV; and
   determining the position of the orthogonal projection FPV-lock relative to the second display window F2, and more particularly relative to the display limit L2 of this window.

Depending on the real position of the symbol (FPV) and on the position of its orthogonal projection (FPV-lock) as determined in this way, the method provides for positioning the symbol (for display purposes) in appropriate manner on the display screen. This appropriate display is performed by giving precedence to the first component FPA of the symbol over the second component (so as to avoid giving erroneous information to the pilot, in particular about the sign of the first component) and while nevertheless conserving some information about the second component, and in particular about its sign. The concept of the two display windows shown in FIG. 3 makes it possible, by reducing the value of the first component, to release display space on the screen for the second component (sign and optionally limited value).

Figure 4:
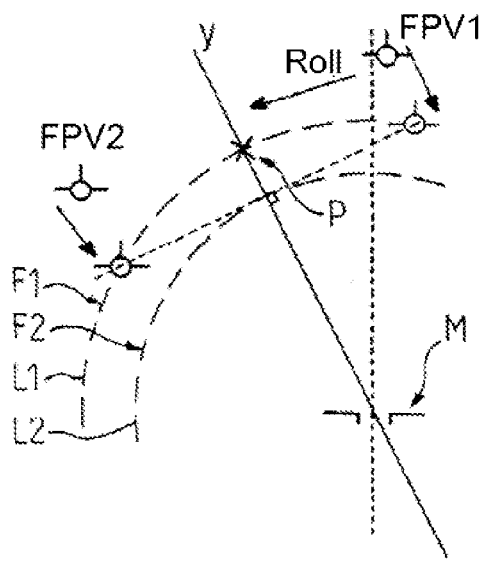
FIG. 4 shows the principle of two display windows as shown in FIG. 3 and applied to the situation of FIG. 1.

Two symbols FPV1 and FPV2 are thus shown in FIG. 4 in their real positions outside the display limit L1 of the larger window F1.

As described above with reference to FIG. 1, with only one display window, the orthogonal projections of the two real positions of the two symbols coincide at a common projection point P (FIG. 4), which does not make it possible to conserve the sign of the second component (yaw angles of the two symbols). A single window thus does not make it possible to distinguish between two symbols having opposite yaw angles.

The function of the smaller window F2 is to define the area in which the orthogonal projection of the symbol FPV on the pitch scale axis is displayed, while the larger window F1 enables the symbol to be positioned so as to indicate the trend of the yaw angle (second component).

Figure 5:
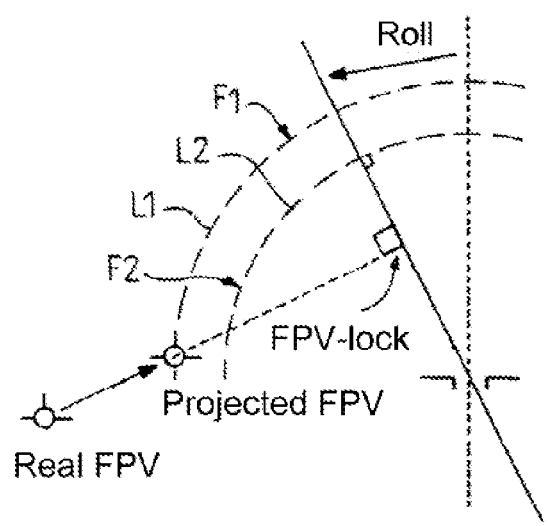
FIGS. 5 and 6 are general diagrammatic views of a display screen using the principle of two display windows and illustrating a second implementation of the method of assisting piloting an aircraft applied to two different situations.
Figure 6:
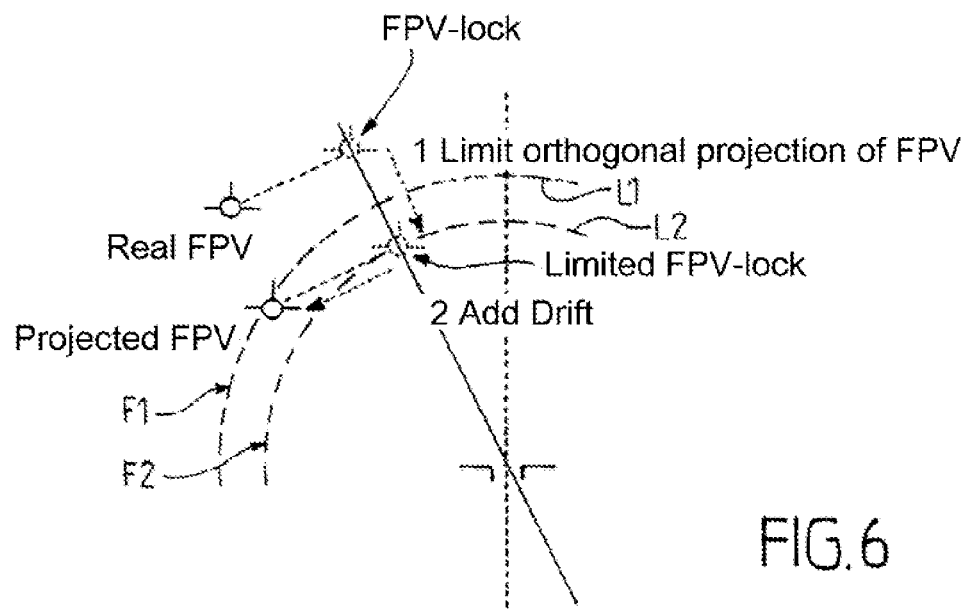

The following FIGS. 5 and 6 show two general situations that can occur at the end of the substep of determining the position of the orthogonal projection FPV-lock on the pitch scale axis relative to the display limit L2 of the second display window F2.

In the first situation shown in FIG. 5, the orthogonal projection FPV-lock of the symbol FPV is situated inside the second window F2. Provision is then made to position the symbol (for display purposes) in a limited position referred to as "projected FPV". This position is obtained by performing a substep of determining a limit for the value of the second component (horizontal drift component) in order to position the symbol on the display limit L1 of the first window F1. In other words, this position corresponds to the orthogonal projection of the real symbol FPV on the display limit L1.

The value of the first component (FPA) of the symbol is conserved in this example, but not the value of the second component, which is limited.

Nevertheless, the sign of the second component is visible on the display screen. It should be observed that provision may also be made to display beside the symbol that is displayed in its limited position (projected FPV), the value of the second component of the symbol before it was limited, in order to provide the pilot with the real value of the yaw angle in addition to its sign.

In the second situation shown in FIG. 6, the orthogonal projection FPV-lock of the symbol FPV on the pitch scale axis lies outside the second window F2. Provision is then made to position the symbol (for display purposes) in a limited position referred to as "projected FPV", by performing the following two substeps:
   determining a limit for the value of the first component of the orthogonal projection FPV-lock on the value that corresponds to the point of intersection between the axis of the first component (y axis of the pitch scale) and the display limit L2 of the second display zone F2, so as to bring the orthogonal projection into an intermediate limited position and thus obtain a limited orthogonal projection that is written "limited FPV-lock" (repositioning step); and
   positioning the limited orthogonal projection "limited FPV-lock" along the axis of the second component (i.e. perpendicularly to the axis of the pitch scale) in a final limited position referred to as "projected FPV". This position corresponds to the orthogonal projection of the real position of the symbol (real FPV) onto the axis of the second component that passes through the position of the orthogonal projection (limited FPV-lock) as determined in the preceding substep. This position (projected FPV) is situated on the display limit L1 of the first display zone or else between the display limits L1 and L2 of the two display zones, depending on the value of the second component of the symbol and depending on the space available between the two display limits (determining the positioning of the projected FPV position relative to the display limit L1).

Once this position has been determined, the symbol is displayed in the position as determined in this way.

Figure 7:
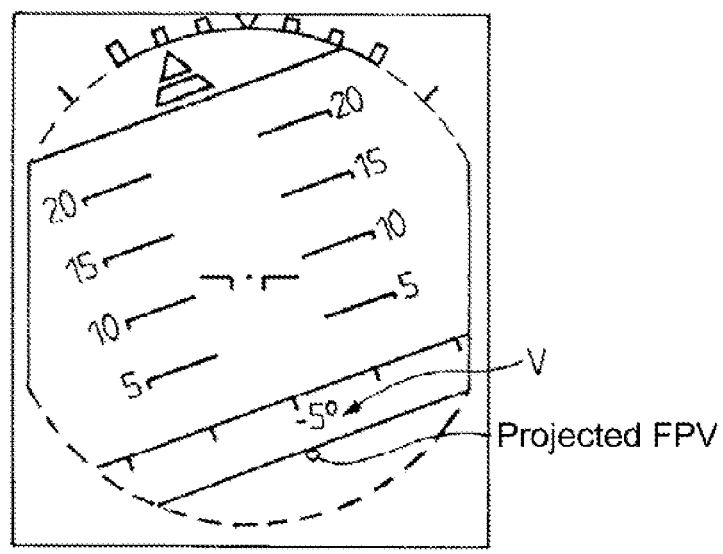
FIG. 7 shows an example of a display screen displaying a first symbol FPV (with its non-limited value) in a limited position as determined using the second implementation of the method of assisting piloting an aircraft.

By applying the above-described positioning rules (set out for the two situations illustrated in FIGS. 5 and 6), the projection of the symbol FPV (limited position of the symbol and display of the symbol in its limited position) is meaningful, i.e. it cannot cause the pilot to believe that the aircraft is climbing (positive vertical component FPA) even though it is descending (negative vertical component FPA), or vice versa. Nevertheless, in the second situation shown in FIG. 6, some of the positive information about the vertical component FPA is lost (giving precedence to the second component). In order to remedy that, it is possible to display the numerical value (prior to limiting) of the vertical component FPA whenever the projection of the symbol FPV does not conserve that value. As shown in FIG. 7, the angle value of −5°, referenced V, is displayed beside the display of the symbol in its limited position (projected FPV).

As already mentioned above, it may also be desirable to display a second symbol on the screen in addition to the first symbol such as the symbol for the parameter FPV, which second symbol may be the symbol for the parameter FD. This parameter is a guide or "director" used when the pilot is flying while making use of the flight path vector FPV. The parameter FD gives vertical and horizontal setpoints to the pilot and the pilot needs to make the symbol representative of the parameter FPV coincide with the symbol for the parameter FD. The symbol FD is thus positioned relative to the position of the symbol FPV.

The projection of the symbol FD (position of the symbol limited by projection onto a display limit) must also be optimized. Where possible, the display window for the symbol FD should be slightly larger than the display window(s) for the symbol FPV (i.e. the display window for the symbol FD is larger than the window F1 that contains the smaller window F2), so as to make it possible always to indicate at least a guide trend, even if the positive aspect of the setpoints is lost.

Figure 8:
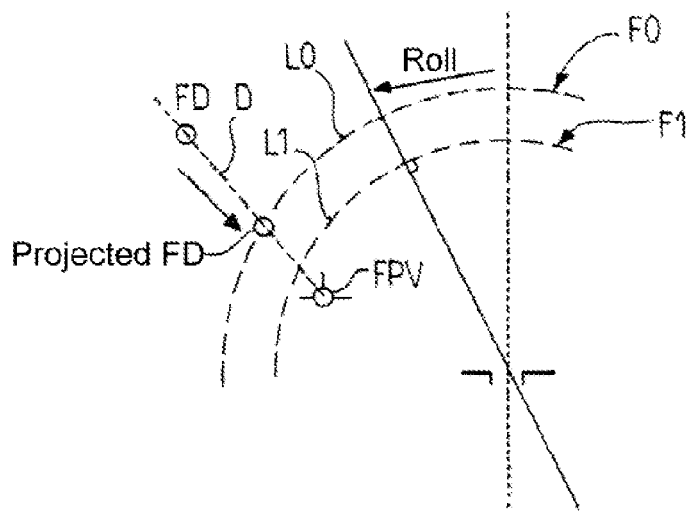
FIG. 8 is a general diagrammatic view of a display screen showing a third implementation of a method of assisting piloting an aircraft applied to displaying a second symbol FD.

FIG. 8 shows a display window F0 for displaying the symbol FD (together with its display limit L0) that encompasses the large window F1 for the symbol FPV.

There follows a description of new rules for positioning the second symbol FD on the display screen.

The piloting assistance method in the third implementation thus makes provision for performing the following substeps in order to display the symbol:
  determining by calculation the real position of the second symbol FD for display relative to the display zone, in particular relative to the display window F0 and its boundary L0, and as a function of the real position as determined in this way;
  displaying the second symbol FD as such (i.e. without limiting the values of its components) within its display window or on its display limit if that is where its real position is situated; or else
  if the real position of the second symbol lies outside the window F0:
    determining a limited position for the second symbol FD, referred to as "projected FD", this position being obtained by projecting the second symbol onto the display limit L0 of the display window F0 along the direction given by the line (half-line) D that passes through the real position of the second symbol FD and the displayed position of the first symbol representative of the flight path vector of the aircraft FPV; and
    displaying the second symbol in its limited position (projected FD). This positioning rule makes it possible to conserve direction information, which is the information that needs to be given precedence in this situation.

The description below sets out in detail an example of the logic applied when determining the display positions for the symbols FPV and FD. It relates more particularly to describing in detail the logic for calculating projections of the first symbol FPV and of the second symbol FD on a display or viewing screen of a control and display system (CDS) of an aircraft with circular display windows. For display windows of different shapes (rectangular, elliptical, or other shapes, in particular shapes that are more complex) the calculations need to be modified accordingly. It should be observed that the invention also applies to other viewing systems, for example of the head-up display (HUD) type with display windows of different shapes (circular, rectangular, elliptical, or indeed of other shapes, in particular shapes that are more complex). It should be observed that in general, the shape of the limitation windows may be adapted depending on display needs.

In order to increase accuracy, it should be observed that it is possible in the positioning logic to use the principle of the component FPA taken to the center of gravity instead of using the component FPA directly, and certain parameters may be filtered, for example. In addition, the yaw angle or Drift components and the FPA components, and also pitch may be multiplied by a constant factor in order to match them to the display scale. In the description below, the terms "FPA", "Drift", "Roll", and "Pitch" are used instead of detailed parameters in order to make the logic of the calculation easier to understand.

The initial stage of calculation relates to calculating the absolute coordinates of the first symbol FPA in the (X,Y) reference frame associated with the screen. The coordinates of the symbol FPV in the reference frame associated with the ground are the Drift component along the horizontal axis $\underline{x}$ and the (FPA-Pitch) component along the vertical axis $\underline{y}$. Rotation is then performed in order to obtain the absolute coordinates in the (X,Y) reference frame associated with the screen:

$x_{spdvec}$=Drift×cos(Roll)−(FPA−Pitch)×sin(Roll)

$y_{spdvec}$=Drift×sin(Roll)−(FPA−Pitch)×cos(Roll)    FPV:

The absolute coordinates of the orthogonal projection are written as follows:

$x_{spdvec\_lock}$=−(FPA−Pitch)×sin(Roll)

Figure 9:
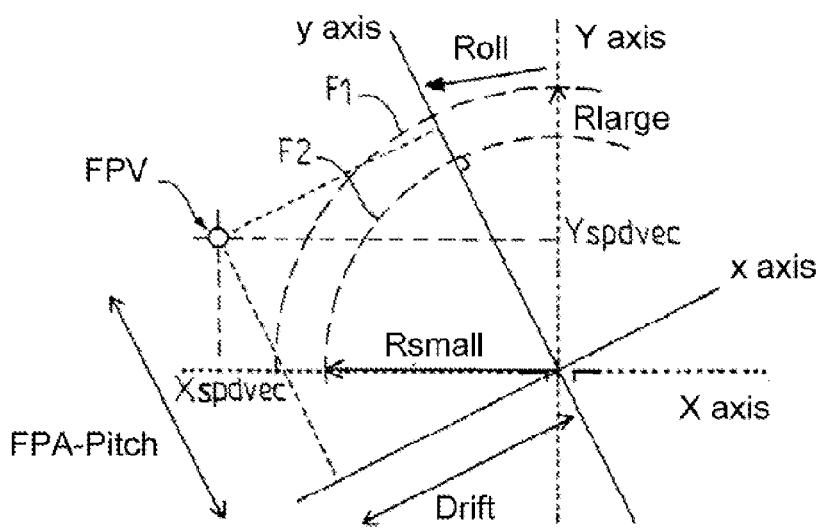
FIG. 9 shows in general manner the positioning of a first symbol FPV relative to two display windows and to the different frames of reference.

$y_{spdvec\_lock}$=(FPA−Pitch)×cos(Roll)    FPV-lock:

FIG. 9 shows the various coordinates depending on the selected reference frames.

The second stage of calculation consists in determining whether the symbol FPV needs to be limited/projected and in selecting the type of projection in order to adapt the display of the symbol (the notations and concepts used with reference to the above-described figures are used again below). This selection is based on two criteria:
  Does the orthogonal projection FPV-lock of the real position of the symbol FPV lie within the small (second) window F2 of radius $R_{small}$? This amounts to determining whether the following inequality is satisfied:

$\sqrt{x_{spdvec\_lock}^2 + y_{spdvec\_lock}^2} \leq R_{small}$

Is the real position of the symbol FPV situated inside the large (first) window F1 of radius $R_{large}$? This amounts to determining whether the following inequality is satisfied:

$\sqrt{x_{spdvec}^2 + y_{spdvec}^2} \leq R_{large}$

As shown in the table below, four projection situations are to be taken into consideration depending on the values of FPV and FPV-lock:

|  | FPV-lock inside the small window F2 | FPV-lock outside the small window F2 |
|---|---|---|
| FPV inside the large window F1 | 1<br>FPV: absolute coordinates<br>FPV-lock: absolute coordinates | 2<br>FPV: limited lock + Drift<br>FPV-lock: limited lock |
| FPV outside the large window F1 | 3<br>FPV: maintain FPA<br>FPV lock: absolute coordinates<br>FPV: limited lock + Drift (*) FPV | 4<br>FPV: limited lock + Drift (*)<br>FPV-lock: limited lock |

(*) Under such circumstances, the horizontal component of Drift may optionally be limited as a function of its value.

The term "absolute coordinates" in box 1 means that no projection of the symbol is needed since, firstly, the real or absolute position of the symbol is situated inside the large window F1, and, secondly, the position of its orthogonal projection FPV-lock is situated inside the small window F2. The coordinates as displayed (on the screen) correspond to the absolute coordinates in the (X,Y) reference frame associated with the aircraft:

$$x_{spdvec\_display} = x_{spdvec} = \text{Drift} \times \cos(\text{Roll}) - (\text{FPA} - \text{Pitch}) \times \sin(\text{Roll})$$

$$y_{spdvec\_display} = y_{spdvec} = \text{Drift} \times \sin(\text{Roll}) - (\text{FPA} - \text{Pitch}) \times \cos(\text{Roll})$$

FPV: The pilot can decide to display the symbol FPV or to display the orthogonal projection FPV-lock of the symbol (taking this symbol into consideration without the second component of Drift) using the following coordinates:

$$x_{spdvec\_lock\_display} = x_{spdvec\_lock} = -(\text{FPA} - \text{Pitch}) \times \sin(\text{Roll})$$

$$y_{spdvec\_lock\_display} = y_{spdvec\_lock} = (\text{FPA} - \text{Pitch}) \times \cos(\text{Roll})$$

FPV-lock: In the other situations of the table, it is necessary to project the symbol.

Boxes 2 and 4 of the above table correspond to situations in which the orthogonal projection FPV-lock of the real position of the symbol FPV lies outside the small window F2 (this is the second type of projection described with reference to FIG. 6).

The situation that corresponds to box 4 of the table (orthogonal projection FPV-lock outside the small window F2 and symbol FPV outside the large window F1) comprises two situations shown respectively in FIGS. 10 and 11 that are described below.

Figure 10:
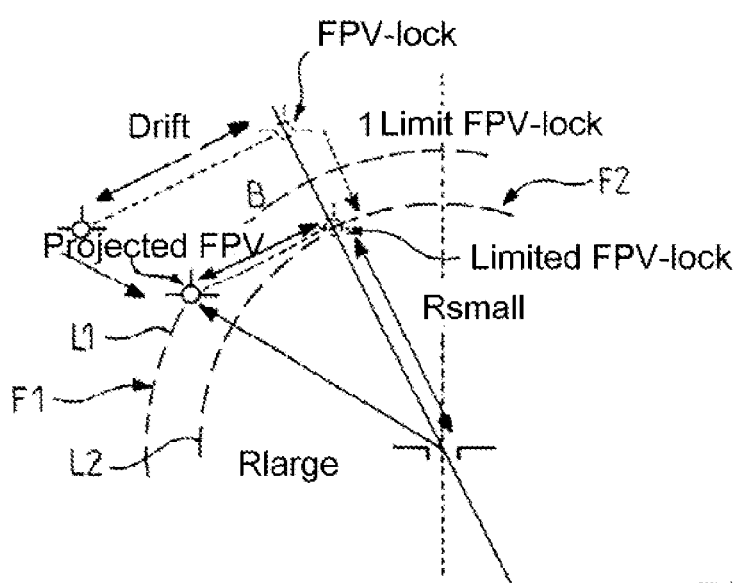
FIGS. 10 to 12 show the positioning in the display of a first symbol FPV as a function of different real positions for the symbol.
Figure 11:
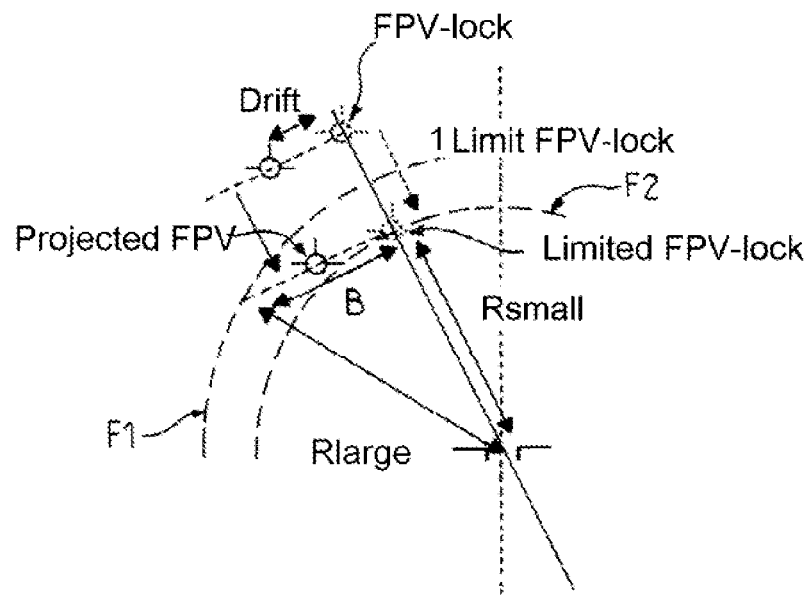

Two situations i) and ii) are identified depending on whether or not the second component (Drift) of the symbol FPV needs to be limited. The test that is performed consists in determining whether the value of the second component (Drift) is or is not greater than the value B as provided by the following equation:

$$B = \sqrt{R_{large}^2 - R_{small}^2}$$

i) In the first situation, if the value of the second component (Drift) is greater than B, then the value of the second component (Drift) needs to be limited as shown in FIG. 10 (otherwise the symbol FPV resulting from the projection/limitation mechanism would lie outside the large window F1). If necessary, the non-limited real value of the second component (Drift) may also be displayed beside the symbol that is displayed in its limited position on the display limit L1 (projected FPV). It should be observed that this additional display may be performed as well as (or instead of) displaying the (non-limited) real value of the first component (vertical component of FPA) beside the symbol.

ii) In the second situation shown in FIG. 11, if the value of the second component (Drift) is less than B, then the value of the second component (Drift) is not limited. Full quantitative information about the second component (Drift) is conserved. The (non-limited) real value of the first component (vertical component of FPA) may be displayed beside the symbol displayed in its limited position on the display limit L1.

The coordinates of the projected symbol FPV as displayed are thus written as follows in the two above-described situations:

Situation 1

$$x_{spdvec\_display} = x_{spdvec\_lock\_limited\_plus\_drift} = x_{spdvec\_lock\_limited} + \text{SIGN}(\text{Drift}) \times B \times \cos(\text{Roll})$$

$$y_{spdvec\_display} = y_{spdvec\_lock\_limited\_limited\_plus\_drift} = y_{spdvec\_lock\_limited} + \text{SIGN}(\text{Drift}) \times B \times \sin(\text{Roll})$$

Situation 2

$$x_{spdvec\_display} = x_{spdvec\_lock\_limited\_plus\_drift} = x_{spdvec\_lock\_limited} + \text{Drift} \times \cos(\text{Roll})$$

$$y_{spdvec\_display} = y_{spdvec\_lock\_limited\_limited\_plus\_drift} = y_{spdvec\_lock\_limited} + \text{Drift} \times \sin(\text{Roll})$$

In the situation corresponding to box 2 of the table (orthogonal projection FPV-lock outside the small window F2 and symbol FPV inside the large window F1) it is possible to transfer the Drift component in full insofar as the real FPV symbol lies inside the large window F1.

Box 3 of the above table corresponds to the situation in which the orthogonal projection FPV-lock of the real position of the symbol FPV lies inside the small window F2 (the orthogonal projection FPV-lock is thus not limited) and the real symbol FPV is outside the large window F1.

The first component (vertical component of FPA) can be maintained, but the symbol FPV must be limited (by projection) since it is situated outside the large window F1. This is the first type of projection described with reference to FIG. 5, and it is shown herein in FIG. 12.

The limited position of the projected symbol (projected FPV) is at a distance A from the axis of the pitch scale, which distance is calculated using the following formula:

$$A = \sqrt{R_{large}^2 - (x_{spdvec\_lock}^2 + y_{spdvec\_lock}^2)}$$

Figure 12:
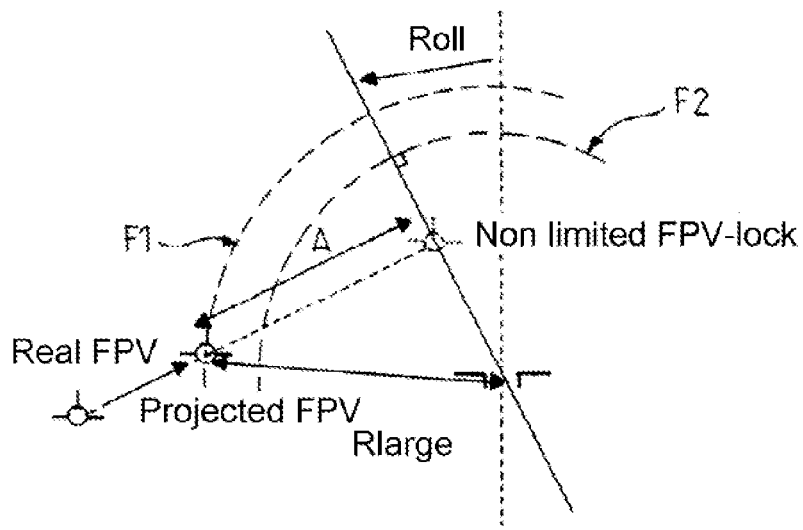

The displayed components of the projected FPV symbol as displayed on FIG. 12 are thus written:

$$x_{spdvec\_display} = x_{spdvec\_conversation\_FPA} = x_{spdvec\_lock} + \text{SIGN}(\text{Drift}) \times A \times \cos(\text{Roll})$$

$$y_{spdvec\_display} = y_{spdvec\_conversation\_FPA} = y_{spdvec\_lock} + \text{SIGN}(\text{Drift}) \times A \times \sin(\text{Roll})$$

It should be observed that the set of situations shown in the above table make it possible to ensure that there is no discontinuity in the display of the symbol (i.e. it moves continuously) on passing from one box of the table to another (e.g. from box 4 to box 2). These positioning rules for displaying the symbol are particularly suited to displaying a dynamic symbol such as the symbol FPV.

The description below relates more particularly to determining the display or viewing position of the second symbol FD. Above-described FIG. 8 is used again for illustrating the calculations below. It should be observed that the second symbol FD is referenced relative to the displayed position of the first symbol FPV.

The commands FD-Roll and FD-Pitch are movement setpoints that are respectively horizontal and vertical (in the terrestrial reference frame (x,y)) for moving the symbol FD respectively horizontally and vertically. The pilot seeks to eliminate the horizontal and vertical differences between the symbol FPV and the symbol FD. By way of example, when performing the method, it should be observed that these commands may be multiplied by a constant factor in order to adapt them to the display scale, and certain parameters may be filtered, for example.

The absolute coordinates of the symbol FD in the frame of reference associated with the aircraft are as follows:

$$x_{FD} = x_{spdvec\_display} + FDROLL \times \cos(Roll) - FDPITCH \times \sin(Roll)$$

$$y_{FD} = y_{spdvec\_display} + FDROLL \times \sin(Roll) - FDPITCH \times \cos(Roll)$$

When the symbol FD is not limited for display purposes (a situation not shown in FIG. 8), i.e. when its real or absolute position lies within its display window F0, the displayed coordinates of the symbol FD correspond to the absolute coordinates of the symbol FD in the reference frame (X,Y) associated with the aircraft:

If $\sqrt{x_{FD}^2 + y_{FD}^2} \leq R_{FD}$

Then the coordinates of the symbol FD are as follows:

$$x_{FD\_display} = x_{FD} = x_{spdvec\_display} + FDROLL \times \cos(Roll) - FDPITCH \times \sin(Roll)$$

$$y_{FD\_display} = y_{FD} = y_{spdvec\_display} + FDROLL \times \cos(Roll) - FDPITCH \times \sin(Roll)$$

Unlike the first symbol FPV, only one limitation/projection situation needs to be envisaged for the second symbol FD.

The position of the symbol FD for display is limited when its real or absolute position is situated outside its display window F0 (as shown in FIG. 8). Under such circumstances, the symbol FD is projected onto the display limit line L0 of its display window F0.

The position of the symbol FD for display is located at the point of intersection between firstly the line D passing through the real position of the symbol FD and the display position of the symbol FPV, and, secondly, the display window F0 (line L0) for the symbol FD. More particularly, it is the point of intersection that is the closest to the symbol FD, thus making it possible to conserve the angle and the direction of the command.

The calculations below serve to determine the display coordinates for the symbol FD (coordinates of the above-mentioned point of intersection).

The first stage of the calculation consists in calculating the parameters of the equation for the line D (line or half-line passing through the display position of the symbol FPV and the real position of the symbol FD). The equation for the line is written $y = S \times X + O$ where S is the slope of the line and O is the intercept on the ordinate axis.

$$S = \frac{y_{FD} - y_{spdvec\_display}}{x_{FD} - x_{spdvec\_display}}$$

$$O = y_{spdvec\_display} - x_{spdvec\_display} \times \frac{y_{FD} - y_{spdvec\_display}}{x_{FD} - x_{spdvec\_display}}$$

By definition, the looked-for point of intersection is situated both on the line D and on the circle (window F0 of radius $F_{FD}$) in such a manner that its coordinates satisfy the following system of equations:

$$\begin{cases} y = S \times x + O \\ R_{FD}^2 = x^2 + y^2 \end{cases}$$

Consequently, the following equation needs to be solved:

$$(1+S^2) \times x^2 + 2 \times S \times O \times x + (O^2 - R_{FD}^2) = 0$$

Its discriminant is written:

$$\Delta = 4 \times (R_{FD}^2 \times (1+S^2) - O^2)$$

The discriminant $\Delta$ is always positive in these calculations insofar as the display window F0 for the symbol FD is greater than the window F1 for the symbol FPV. There are thus always two points of intersection between the line B and the display window F0 for the symbol FD.

This equation has two pairs of coordinates as solutions:

$$\begin{cases} x_1 = \dfrac{-2 \times S \times O - \sqrt{\Delta}}{2 \times (1+S^2)} \\ y_1 = S \times x_1 + O \end{cases}$$

and $$\begin{cases} x_2 = \dfrac{-2 \times S \times O + \sqrt{\Delta}}{2 \times (1+S^2)} \\ y_2 = S \times x_2 + O \end{cases}$$

The last stage of calculation lies in selecting between the two points of intersection. The point of intersection that is selected is the point that is closer to the absolute position of the symbol FD (point situated on the right in FIG. 8):

If $$\sqrt{(x_1 - x_{FD})^2 + (y_1 - y_{FD})^2} \leq \sqrt{(x_2 - x_{FD})^2 + (y_2 - y_{FD})^2}$$

then $$x_{FD\_display} = x_1$$

$$y_{FD\_display} = y_1$$

Else $$x_{FD\_display} = x_2$$

$$y_{FD\_display} = y_2$$

It should be observed that the method of assisting piloting an aircraft as described above applies equally well to a head-down display screen and to a head-up display screen.

The method relies on new positioning rules that provide the pilot with a display of dynamic symbols that is reliable, i.e. without erroneous information.

The method relies on positioning criteria that can be modulated as a function of defined priorities and display needs.

Figure 13:
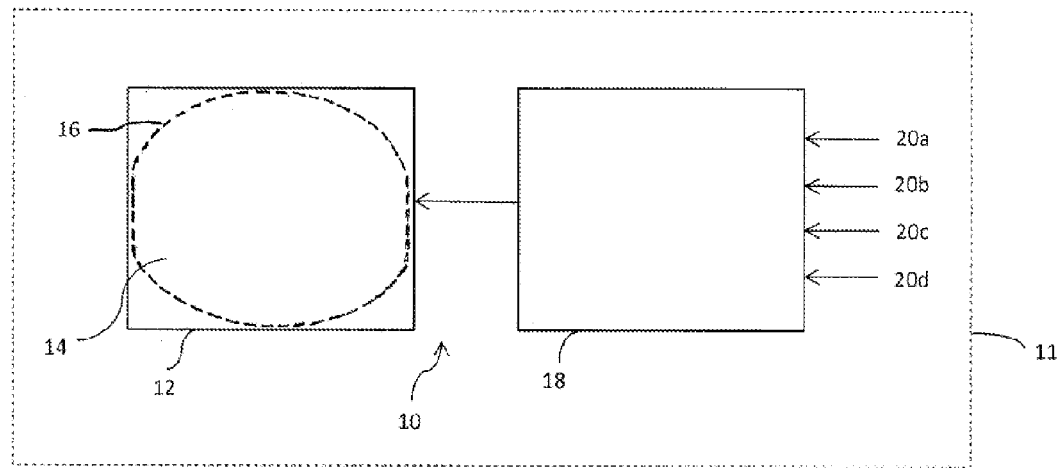
FIG. 13 is a diagrammatic view of a system for assisting piloting in an embodiment of the invention.

FIG. 13 shows an embodiment of a system 10 of the invention for assisting piloting that is provided on board an aircraft represented by the dotted line 11.

The system 10 comprises a display screen or medium 12 that has a display zone 14 bounded by a display limit line 16.

By way of example, the display screen is a screen of the same type as those described with reference to the preceding figures.

The system 10 also has a data processor unit or calculation unit 18 (e.g. on-board computer) that receives and processes data/information (position data, ...) coming from various pieces of equipment 20*a-d* on board the aircraft (sensors, on-board computers, ...). The processing of this data leads to determining a position for displaying one or more symbols such as the above-described symbols FPV and FD. The data/information representative of such a display position is then transmitted to the display screen 12 so as to display the symbol in the determined display position.

By way of example, the data/information is previously formatted by the unit 18 in the form of one or more video images incorporating the position(s) of the symbol(s).

Figure 14:
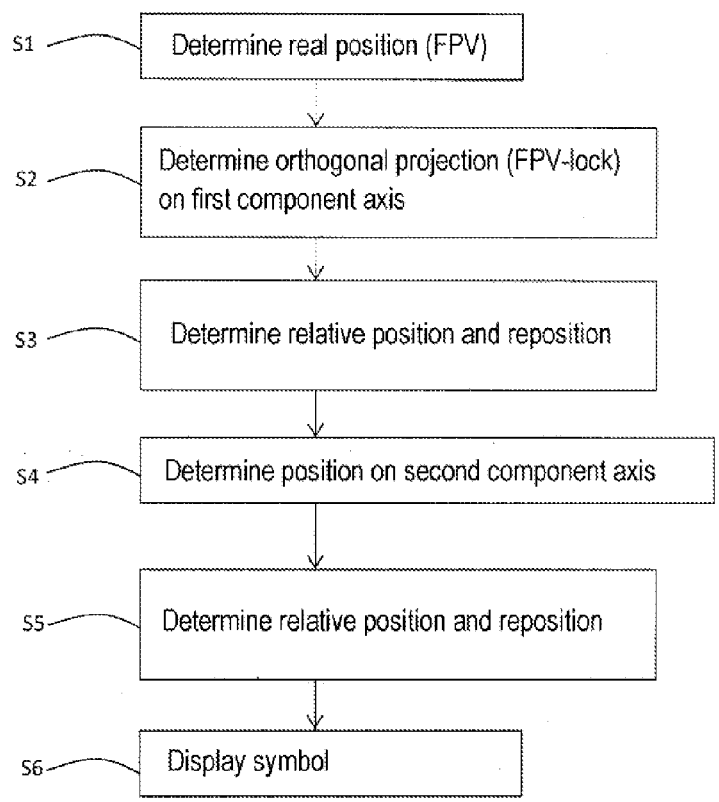
FIG. 14 shows an algorithm illustrating the main steps of a method of assisting piloting in an implementation of the invention.

The data processor unit 18 includes the necessary means or is configured to execute the steps of the piloting assistance method in the above-described implementations, and in general, the steps S1 to S6 of the method as shown in FIG. 14.

The algorithm of FIG. 14 comprises the following main steps S1 to S6:

Step S1: determining the real position of a symbol (e.g. FPV) for displaying relative to the display zone.

Step S2: determining the orthogonal projection (FPV-lock) of the real position of the symbol on the axis of the first component of said symbol.

Step S3: determining the position of this projection (FPV-lock) relative to the display limit line of the display zone (relative position) and, in the event that this projection lies outside the display limit line, repositioning the projection (FPV-lock) on the display limit line.

Step S4: determining the position of the symbol on the axis of the second component (orthogonal projection of the real position of the symbol on the axis of the second component) passing through the position determined in step S3, as a function of the value of the second component of the symbol.

Step S5: determining the position determined in step S4 (second projection) relative to the display limit line of the display zone (relative positioning) and, in the event that this position along the axis of the second component (second projection) lies outside the display limit line, repositioning this position (second projection) on the display limit line.

Step S6: displaying the symbol (FPV) on the display screen 12 in the display position as determined in step S5.

It should be observed that the steps S1 to S6 correspond to instructions or portions of code of a computer program that is loaded into the unit 18 and executed on command to perform the method in question.

The on-board calculation unit 18 serves to determine information (e.g. position for displaying a symbol) and to display this information for the attention of the pilot, which information would not be displayed in the absence of the invention.

The calculation unit makes it possible to display the information as determined in this way in a form that is directly understandable by a pilot.

The display of this information which is representative of the real behavior of the aircraft is thus reliable and does not mislead the pilot.

The invention claimed is:

1. A method of assisting the piloting of an aircraft in which at least one display screen has at least one display zone bounded by a display limit line, the real position of the aircraft being positioned on said at least one display zone relative to a horizontal-vertical frame of reference associated with the screen and a terrestrial horizontal-vertical frame of reference having at least one of its axes displayed by at least one symbol representative of a parameter associated with the dynamic behavior of the aircraft (FPV, ...) or of a parameter liable to influence this behavior (FD, ...), the at least one symbol having a horizontal component and a vertical component, the method comprising:

displaying said at least one symbol in said at least one display zone in order to assist the piloting of the aircraft when the real position (FPV) of said at least one symbol lies outside the display limit line, wherein one of the horizontal and vertical components of the at least one symbol, referred to as a "first" component, is to be given precedence on display of the at least one symbol in said at least one display zone over a second component of the horizontal and vertical components of the at least one symbol, the method further comprising:

determining the real position (FPV) of said at least one symbol for display relative to said at least one display zone of the at least one display screen;

determining an orthogonal projection (FPV-lock) of the real position of said at least one symbol on an axis corresponding to the first component;

determining the position of said orthogonal projection (FPV-lock) relative to the display limit line of the at least one display zone, and in the event that said orthogonal projection (FPV-lock) is situated outside said display limit line, repositioning said orthogonal projection (FPV-lock) on said display limit line;

determining the position of said at least one symbol on an axis corresponding to the second component passing through the position determined in the preceding step as a function of the value of the second component of said at least one symbol;

determining said position of the at least one symbol relative to the display limit line of said at least one display zone, and in the event that said position of the at least one symbol is situated outside said display limit line, repositioning said position of the at least one symbol on said display limit line; and displaying said at least one symbol in the display position as determined in the preceding step.

2. The method according to claim 1, wherein while the orthogonal projection (FPV-lock) of the real position (FPV) of said at least one symbol is situated inside said at least one display zone bounded by the display limit line, the method includes a substep of determining a limitation for the value of the second component of said at least one symbol in order to position said at least one symbol in a limited position that is situated on the display limit line of said at least one display zone.

3. The method according to claim 1, wherein said at least one display zone has a first display zone (F1) inside which there is arranged a second display zone (F2), the display position of said at least one symbol depending more particularly, firstly on the orthogonal projection (FPV-lock) on the axis of the first component of the real position (FPV) of said at least one symbol, and secondly on the position of said projection relative to the display limit line of the second display zone (F2).

4. The method according to claim 3, wherein while the orthogonal projection (FPV-lock) of the real position (FPV) of said at least one symbol is situated inside the second display zone (F2) bounded by the display limit line (L2), the method includes a substep of determining a limitation for the value of the second component of said at least one symbol in order to position said at least one symbol in a limited position that is situated on the display limit line (L1) of the first display zone (F1).

5. The method according to claim 3, wherein while the orthogonal projection (FPV-lock) is situated outside the second display zone (F2) bounded by its display limit line (L2), the method includes the following two substeps:
- determining a limitation for the value of the first component of the orthogonal projection (FPV-lock) to the value corresponding to the intersection between the axis of the first component and the display limit line (L2) of the second display zone (F2) so as to take the orthogonal projection (FPV-lock) to an intermediate limited position and obtain a limited orthogonal projection (FPV-lock); and
- determining the position of said at least one symbol on the axis of the second component passing through the position of the limited orthogonal projection (FPV-lock) determined in the preceding step as a function of the value of the second component of said at least one symbol.

6. The method according to claim 3, wherein the two display zones (F1, F2) are defined relative to each other so as to be spaced far enough apart to make it possible, if necessary, to display said at least one symbol between the display limit lines (L1, L2) of said display zones.

7. The method according to claim 1, wherein the axis of the first component is selected relative to a predetermined criterion.

8. The method according to claim 1, wherein the axis of the first component is the pitch scale axis that is displayed on said at least one display zone.

9. The method according to claim 2, further comprising displaying beside said at least one symbol displayed in its limited position, the value of the first component of said at least one symbol prior to being limited.

10. The method according to claim 1, wherein said at least one symbol has a vertical first component and a horizontal second component, the vertical first component being given precedence in the display over the second component.

11. The method according to claim 1, wherein said at least one symbol for displaying comprises a first symbol representative of the flight path vector (FPV) in which the horizontal component is drift and the vertical component is flight path angle.

12. The method according to claim 11, wherein said at least one symbol for display also comprises a second symbol representative of an aircraft guide parameter (FP) and constitutes a flight path setpoint to be reached by the flight path vector (FPV) of the aircraft.

13. The method according to claim 12, wherein said at least one display zone also comprises a display zone (F0) for displaying the second symbol representative of an aircraft guide parameter (FD) and having arranged therein said at least one display zone for displaying the first symbol.

14. The method according to claim 13, wherein the step of displaying the second symbol representative of an aircraft guide parameter (FD) comprises, more particularly, a substep performed as a function of the real position of said second symbol relative to the display limit line (L0) of said display zone for the second symbol:
- displaying said second symbol (FD) in said display zone in its real position; or
- determining a limited position for said second symbol (FD) by projecting said second symbol onto the display limit line (L0) of said display zone (F0) in the direction given by the line passing through the real position of said second symbol (FD) and the position displayed in said at least one display zone for the first symbol of the first symbol representative of the flight path vector (FPV) of the aircraft, and displaying said second symbol in its position as limited in this way.

15. A non-transitory, computer-readable storage medium storing a computer program including instructions for executing, when said program is executed by a system comprising a data processor unit in which said computer program is loaded, a method of assisting the piloting of an aircraft in which at least one display screen has at least one display zone bounded by a display limit line, the real position of the aircraft being positioned on said at least one display zone relative to a horizontal-vertical frame of reference associated with the screen and a terrestrial horizontal-vertical frame of reference having at least one of its axes displayed by at least one symbol representative of a parameter associated with the dynamic behavior of the aircraft (FPV, . . . ) or of a parameter liable to influence this behavior (FD, . . . ), the at least one symbol having a horizontal component and a vertical component, the method comprising: displaying said at least one symbol in said at least one display zone in order to assist in the piloting of the aircraft when the real position (FPV) of said at least one symbol lies outside the display limit line, wherein one of the horizontal and vertical components of the at least one symbol, referred to as a "first" component, is to be given precedence on display of the at least one symbol in said at least one display zone over a second component of the horizontal and vertical components of the at least one symbol, the method further comprising:
- determining the real position (FPV) of said at least one symbol for display relative to said at least one display zone of the at least one display screen;
- determining an orthogonal projection (FPV-lock) of the real position of said at least one symbol on an axis corresponding to the first component;
- determining the position of said orthogonal projection (FPV-lock) relative to the display limit line of the at least one display zone, and in the event that said orthogonal projection (FPV-lock) is situated outside said display limit line, repositioning said orthogonal projection (FPV-lock) on said display limit line;
- determining the position of said at least one symbol on an axis corresponding to the second component passing through the position determined in the preceding step as a function of the value of the second component of said at least one symbol;
- determining said position of the at least one symbol relative to the display limit line of said at least one display zone, and in the event that said position of the at least one symbol is situated outside said display limit line, repositioning said position of the at least one symbol on said display limit line; and
- displaying said at least one symbol in the display position as determined in the preceding step.

16. A system for assisting the piloting an aircraft, the system comprising at least one display screen that includes at least one display zone bounded by a display limit line, the real position of the aircraft being positioned on said at least one display zone relative to a horizontal-vertical frame of reference associated with the display screen and a terrestrial horizontal-vertical frame of reference having at least one of its axes displayed, by means of at least one symbol representative of a parameter associated with the dynamic behavior of the aircraft (FPV, . . . ) or of a parameter liable to influence this behavior (FD, . . . ), the at least one symbol having a horizontal component and a vertical component, wherein one of the horizontal and vertical components the at least one symbol, referred to as a "first" component, is given precedence on display of the at least one symbol in said at least one display zone over a second component of the horizontal and vertical components the at least one symbol, the system further comprising a data processor for:
- determining the real position (FPV) of said at least one symbol for display relative to said at least one display zone of the at least one display screen;
- determining an orthogonal projection (FPV-lock) of the real position of said at least one symbol on an axis corresponding to the first component;
- determining the position of said orthogonal projection (FPV-lock) relative to the display limit line of said at least one display zone, and in the event that said orthogonal projection (FPV-lock) is situated outside said display limit line, for repositioning said orthogonal projection on said display limit line;
- determining the position of said at least one symbol on an axis corresponding to the second component passing through the position determined in the preceding determination as a function of the value of the second component of said at least one symbol;
- determining said position of the at least one symbol relative to the display limit line of said at least one display zone, and in the event that said position of the at least one symbol is situated outside said display limit line, for repositioning said position on said display limit line; and
- displaying on said at least one symbol screen said at least one symbol in the display position as determined in the preceding determination performed by the data processing unit.

17. An aircraft comprising a system for assisting the piloting of an aircraft, the system comprising at least one display screen that includes at least one display zone bounded by a display limit line, the real position of the aircraft being positioned on said at least one display zone relative to a horizontal-vertical frame of reference associated with the display screen and a terrestrial horizontal-vertical frame of reference having at least one of its axes displayed by means of at least one symbol representative of a parameter associated with the dynamic behavior of the aircraft (FPV, . . . ) or of a parameter liable to influence this behavior (FD, . . . ), the at least one symbol having a horizontal component and a vertical component, wherein one of the horizontal and vertical components of the at least one symbol, referred to as a "first" component, is given precedence on display of the at least one symbol in said at least one display zone over a second component of the horizontal and vertical components of the at least one symbol, the system further comprising a data processor unit for:
- determining the real position (FPV) of said at least one symbol for display relative to said at least one display zone of the at least one display screen;
- determining an orthogonal projection (FPV-lock) of the real position of said at least one symbol on an axis corresponding to the first component;
- determining the position of said orthogonal projection (FPV-lock) relative to the display limit line of said at least one display zone, and in the event that said orthogonal projection (FPV-lock) is situated outside said display limit line, for repositioning said orthogonal projection (FPV-lock) on said display limit line;
- determining the position of said at least one symbol on an axis corresponding to the second component passing through the position determined in the preceding determination as a function of the value of the second component of said at least one symbol;
- determining said position of the at least one symbol relative to the display limit line of said at least one display zone, and in the event that said position of the at least one symbol is situated outside said display limit line, for repositioning said position on said display limit line; and
- displaying on said at least one symbol screen said at least one symbol in the display position as determined in the preceding determination performed by the data processor unit.

\* \* \* \* \*